Oct. 18, 1955 — F. P. MARTIN — 2,720,947
BRAKE DRUM COOLING
Filed Nov. 17, 1951 — 2 Sheets-Sheet 1
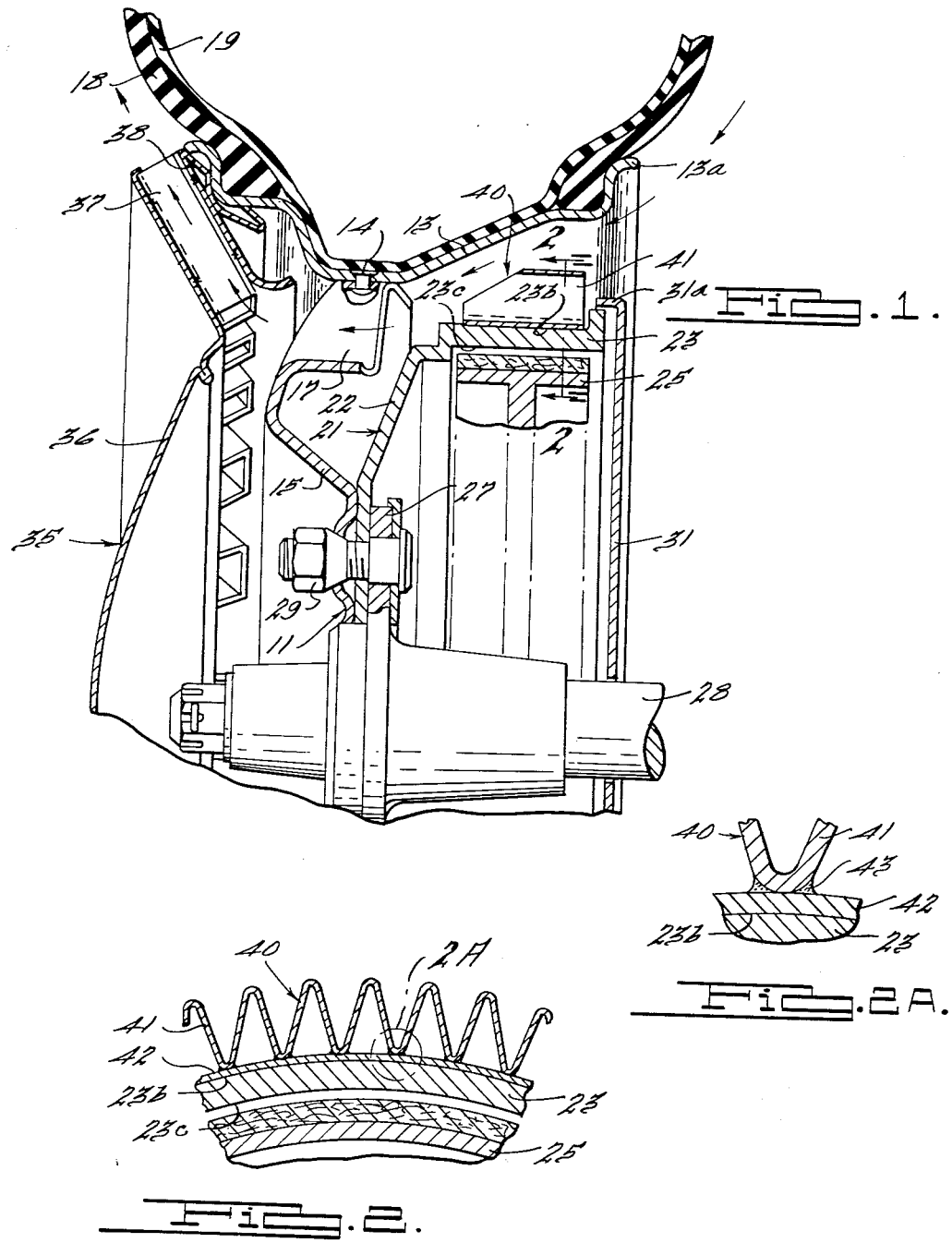
INVENTOR.
Ferman P. Martin
BY
Harness and Harris
ATTORNEYS

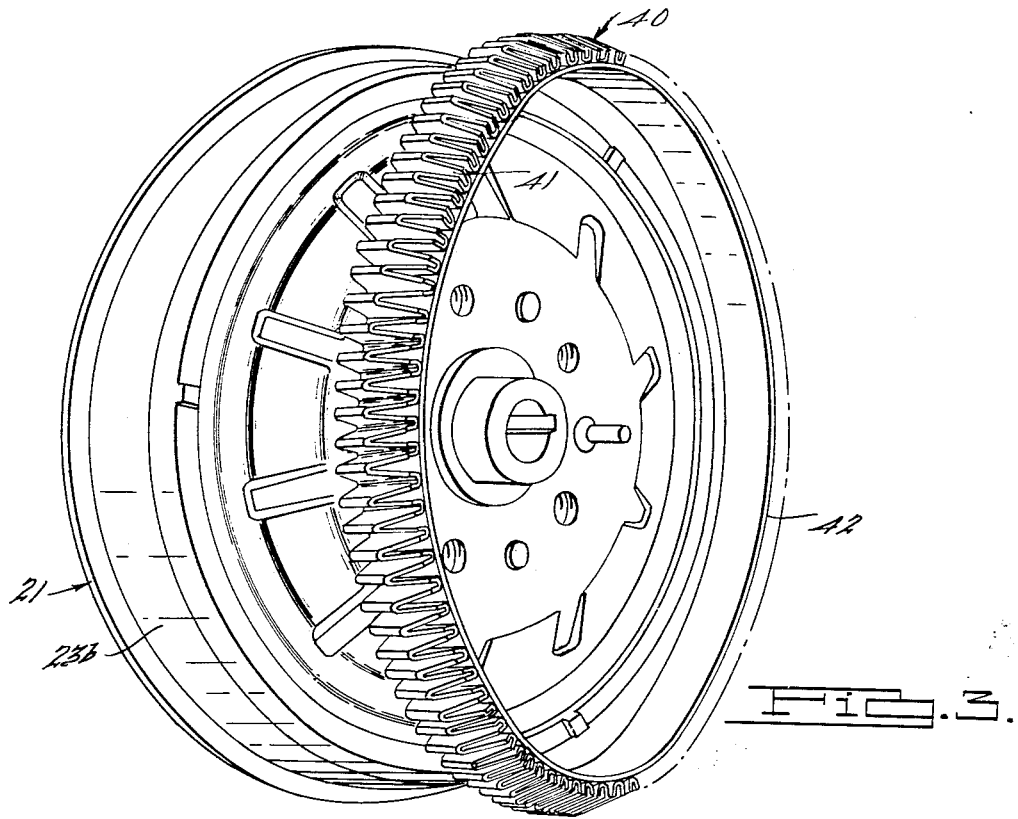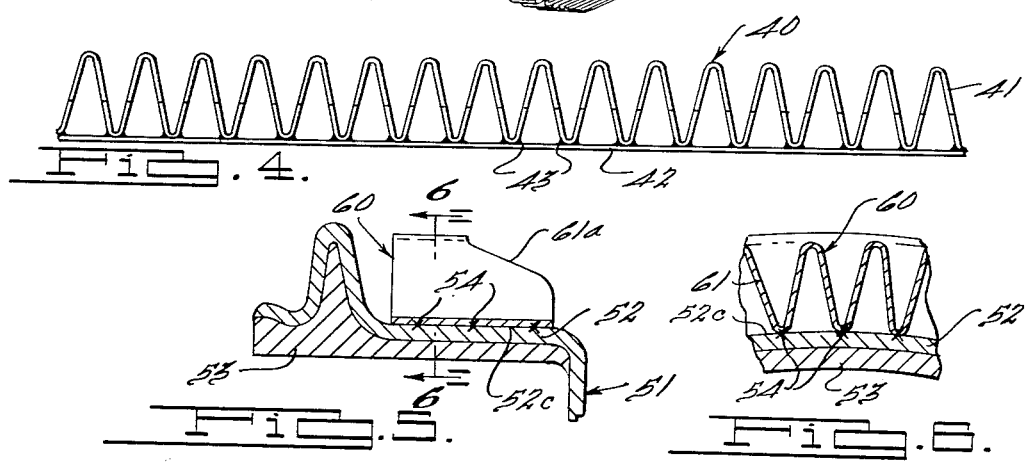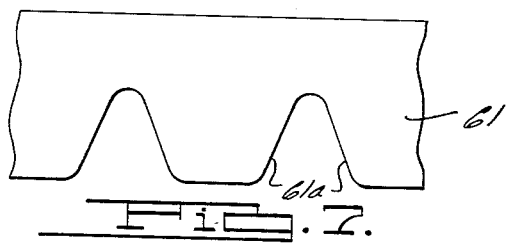

United States Patent Office 2,720,947
Patented Oct. 18, 1955

2,720,947

BRAKE DRUM COOLING

Ferman P. Martin, Detroit, Mich., assignor to Chrysler Corporation, Highland Park, Mich., a corporation of Delaware Application November 17, 1951, Serial No. 256,873

3 Claims. (Cl. 188—264)

This invention relates to a device for readily dissipating the heat from a rotatable brake drum or the like.

It is a primary object of this invention to provide a simple, economical, brake drum heat dissipating structure that may be readily incorporated in any conventional brake drum structure so as to provide improved brake operation.

It is a further object of this invention to provide a finned ring that may be mounted about the periphery of a brake drum to readily dissipate the heat therefrom and to further serve as a vibration damping device to reduce and/or eliminate various types of braking noise.

It is still another object of this invention to provide a brake drum heat dissipating structure that comprises a drum encircling finned ring formed from a twisted strip of heat conducting material that may be readily connected to the drum periphery.

It is still another object of this invention to provide a brake drum heat dissipating structure that comprises a finned ring of heat dissipating material that has suitable thermal properties to permit its attachment to the periphery of a brake drum by a shrink fit.

It is still another object of this invention to provide a brake drum heat dissipating structure comprising a drum encircling finned ring of corrugated strip-like material that may be directly connected to the periphery of a brake drum.

It is also an object of this invention to provide a combination of a wheel mounted air circulating fan, a perforated wheel disc and a brake drum mounted finned heat dissipating ring whereby improved braking operation may be attained.

It is also an object of this invention to secure improved braking operation by associating a brake drum mounted, heat dissipating, finned ring with an air circulating means that forces cooling air across the finned ring.

Other objects and advantages of this invention will become readily apparent from a reading of the following description and a consideration of the related drawings wherein:

Fig. 1 is a fragmentary transverse sectional elevational view of a portion of a vehicle wheel and brake assembly that embodies one form of this invention;

Fig. 2 is an enlarged fragmentary sectional elevational view of the brake drum cooling fin structure shown in Fig. 1, the view being taken along the line 2—2 of Fig. 1;

Fig. 2A is an enlarged fragmentary sectional elevational view of the brazed connection of the fin ring to its supporting rim, the view being taken at the encircled portion 2A of Fig. 2;

Fig. 3 is a perspective view of the brake drum and the heat dissipating finned ring shown in Fig. 1, the drum and ring being shown prior to mounting of the ring on the drum;

Fig. 4 is a side elevational view of the assembled components of the finned ring shown in Fig. 1 prior to their being bent to final form;

Fig. 5 is a fragmentary sectional elevational view of a modified form of brake drum cooling finned ring;

Fig. 6 is a fragmentary sectional elevational view of the form of the finned ring shown in Fig. 5, the view being taken along the line 6—6 of Fig. 5; and Fig. 7 is a fragmentary plan elevation of the finned ring strip shown in Figs. 6 and 7 prior to folding of the strip blank into its final corrugated form.

As a result of the general desire to improve the visual appearance of the current motor vehicle, it has become quite prevalent to provide motor vehicle wheels with decorative wheel covers. These covers tend to substantially close off the axially directed circulation of air through the wheels and across the associated wheel brake drums and braking mechanisms. Current body styling also tends to conceal the wheels and the brake drums from view and to prevent the free flow of cooling air around the brake drums. At the same time vehicle speeds have increased without an equivalent increase in the size of the associated brake drums consequently more heat is being generated in the drums during braking action while less efficient forms of heat dissipating devices are provided for the drums. This invention comprises a drum encircling finned ring that provides a most economical, efficient form of drum heat dissipating device. The disclosed drum cooling means is so constructed and arranged that a maximum cooling effect is achieved and at the same time noise vibrations are damped so as to provide a quiet brake mechanism.

In the drawings the numeral 11 represents a conventional wheel unit formed from an annular rim 13 connected by rivets 14 to a disc-like wheel web portion 15. The periphery of the web portion 15 is formed with a plurality of substantially semi-circular, radially indented, openings 17 that provide air circulation channels through the wheel web portion 15. The purpose of the openings 17 will become readily apparent from the subsequent description. A tire casing 18, provided with an inflatable tube element 19, is mounted on the rim 13 in conventional manner.

Mounted on the rear or inner side of the wheel web portion 15 is a brake drum 21. The brake drum shown in Fig. 1 is a cup-like casting of conventional design although the drum may be of stamped composite design as shown in Fig. 5. Brake drum 21 includes the dished, plate-like support portion 22 from which there projects the annular, axially extending, peripheral flange portion 23. Portion 23 provides the braking area which is adapted to be engaged by the movable brake shoes 25. Drum flange portion 23 is formed along its inner side with a brake shoe engaging surface 23c which may be composed of some wear resistant, rigid, ferrous material such as cast iron or steel. The outwardly exposed surface portion 23b of the brake drum flange is surrounded by a ring 40 that mounts a plurality of substantially radially extending cooling fins 41. The ring assembly 40 is subsequently described in detail. The fins 41 of the ring 40 are adapted to quickly dissipate the heat generated within the brake drum during application of the shoes 25 to the drum portion 23c during braking operations.

The wheel unit web portion 15 and the plate portion 22 of brake drum 21 are secured to the radial extending flange portion 27 of the wheel axle 28 by the bolt and nut connecting means 29. A dust cover 31 extends across the inner open side of the brake drum 21 so as to provide a means for preventing foreign matter from entering the chamber within brake drum 21. It will be noted that the area between the periphery 31a of the dust cover 31 and the inner edge 13a of the wheel rim portion 13 is open to provide an entrance through which axially moving air on the inner side of the wheel may readily pass to reach the openings 17 in the wheel web portion 15. Air passing through this entrance area is drawn across the cooling fins 41 on the brake drum 21 and this dissipates the heat on the fins and cools the brake drum. The many advantages secured by the ready dissipation of the heat of the brake drum, which heat is generated during braking, will not be enumerated now for it is thought that these advantages are well known in the art.

To improve the circulation of air across the portion of the brake drum that contains the set of cooling fins 41, there is provided a centrifugal fan element 37 that is an integral part of the decorative wheel cover unit 35. Fan 37 causes an axially directed flow of cooling air across the fins 41 on wheel rotation as indicated by the arrows in Fig. 1. Wheel cover unit 35 is adapted to be detachably mounted on the outer or normally exposed side of the wheel unit 11 by spring clip means or the like. Wheel cover 35 is composed of three principal elements, an outer cover plate or disc 36, an annular corrugated fan element 37 and a cover retaining ring 38. These three elements of the wheel cover are assembled as an integral unit so that the wheel cover unit may be quickly and easily applied to any conventional motor vehicle wheel assembly. This specific cover 35 forms no part of this invention as it is covered by the copending application of John P. Butterfield, Serial No. 103,780, filed July 9, 1949, and now Patent Number 2,633,944, issued April 7, 1953.

In the form of the invention shown in Figs. 1–4 the brake drum 21 is a casting which may be of some ferrous material such as cast iron or steel. The outer surface 23b of the drum flange 23 is machined to provide a smooth seat for the rim element 42 of the fin ring 40. Rim element 42 is preferably formed from a strip of spring steel or some similar material that will expand and contract, with changes in temperature of between 0° and 700°–800° F., without taking any substantial permanent set. At normal temperatures the inside diameter of the circular rim 42 is slightly less than the outside diameter of the brake drum 21 measured between diametrically opposed portions of the rim seat 23b. The reason for this specified relationship is that it has been found advantageous to mount the ring 40 on the drum 21 by shrinking the rim 42 on the outer periphery 23b of the drum flange 23. The rim 42 of ring 40 has mounted about it a corrugated strip of thin cold rolled steel, or the like, that provides the several substantially radially extending, integral fins 41 of the fin ring 40. The fin corrugations 41 are permanently connected to the rim 42 by brazing, welding, or the like, as indicated at 43. The rim 42 and the corrugated fins 41 are both good thermal conductors and the corrugated fins 41 provide a large surface area for heat dissipation. It is thought to be evident that the shrink fit of the rim 42 to the machined seat on drum flange 23c gives a firm bond that will readily transfer heat from the drum to the fins 41. It has been found that a relatively high rate of brake drum cooling can be obtained with brake drums equipped with this very simple form of finned ring construction and as a result improved braking may be achieved.

It has also been found that the corrugated fins 41 provide a dual function in that they serve as vibration damping devices that damp out noise in the associated brake. It has been common in the brake field to stretch a coil spring around the periphery of a brake drum to damp out certain types of brake noise. However, such damping springs have never been used to dissipate drum heat for they were not of a design to effectively accomplished such a function. In the constructions here-in disclosed the corrugated fins 41 permit the elimination of the coil type damping spring and thus a cost savings is realized in addition to improved brake performance.

An inspection of Fig. 4 will bring out that after corrugating a flat strip to provide the integral fins 41, the flat rim strip 42 is next connected to the fins 41 and thereafter the rim 42 is bent to circular form and its opposed ends butt welded or otherwise suitably connected. As aforementioned the length of the rim strip 42 is slightly less than the outside circumference of the drum flange 23 so as to permit shrinking of the rim 42 on the associated drum flange 23.

Figs. 5 and 6 show a modfied form of this invention wherein the cost of the fin ring 60 is less than that of the fin ring 40 due to the elimination of the rim element that would correspond to the rim 42 of the fin ring 40. In Figs. 5 and 6 it will be noted that the drum 51 is of a composite built-up type having a stamped web and outer drum flange portion 52 and a cast drum liner portion 53. In this form of the invention the fin ring 60 is composed of nothing but a corrugated strip that provides a plurality of radially extending integral fins 61. The fin strip 61 is placed about the outer peripheral surface 52c of the drum flange 52 and then the fins are connected to the drum flange surface 52c by spot welding 54 or by some similar form of connection. One or the other of the outer end edges of the fins 61 may be cut away for clearance purposes as indicated at 61a. It is thought to be obvious that the corrugated fin strip 61 can be directly connected to the drum flange 52 due to the fact that the flange 52 is a stamping whereas a fin strip, like the fin strip 61, might not be spot welded or similarly connected to a cast drum such as that shown at 21 in Fig. 1. The several advantages achieved with the fin ring 40 are likewise obtainable with the fin ring 60.

I claim:

1. In combination, an annular brake drum having a substantially axially extending peripheral flange and a ring of heat conducting and dissipating material bonded to the outer side of said flange, said ring comprising a rim element of heat conducting material concentrically arranged about said flange and fixedly connected thereto and an annular corrugated strip of heat conducting material formed to provide a plurality of substantially radially extending fins encircling said rim element and fixedly connected thereto at circumferentially spaced points.

2. In combination, an annular brake drum having a substantially axially extending peripheral flange and a ring of heat conducting and dissipating material bonded to the outer side of said flange, said ring comprising a rim element of heat conducting material concentrically arranged about said flange and fixedly connected thereto by a shrink fit and an annular corrugated strip of heat conducting material formed to provide a plurality of substantially radially extending fins encircling said rim element and fixedly connected thereto.

3. In combination, an annular brake drum of cast material having a substantially axially extending peripheral flange and a ring of heat conducting and dissipating material encircling said drum flange and connected thereto, said ring comprising a rim element of heat conducting material encircling said drum flange and fixedly connected thereto by a shrink fit, and an annular corrugated strip of heat conducting material formed to provide a plurality of substantially radially extending fins surrounding said rim element and fixedly bonded thereto.

References Cited in the file of this patent

UNITED STATES PATENTS

| | | |
|---|---|---|
| 1,397,430 | Lankheet | Nov. 15, 1921 |
| 1,623,706 | Schmidt | Apr. 5, 1927 |
| 1,792,823 | Day | Feb. 17, 1931 |
| 1,814,575 | Tatter | July 14, 1931 |
| 1,928,079 | Taylor | Sept. 26, 1933 |
| 1,978,563 | Bragg | Oct. 30, 1934 |
| 2,197,232 | Wood | Apr. 16, 1940 |
| 2,425,116 | Musselman | Aug. 5, 1947 |
| 2,441,008 | Chase | May 4, 1948 |